US006658415B1

(12) United States Patent
Brown et al.

(10) Patent No.: US 6,658,415 B1
(45) Date of Patent: Dec. 2, 2003

(54) MONITORING AND MANAGING USER ACCESS TO CONTENT VIA A UNIVERSALLY ACCESSIBLE DATABASE

(75) Inventors: Michael Wayne Brown, Georgetown, TX (US); Kelvin Roderick Lawrence, Round Rock, TX (US); Michael A. Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/560,394

(22) Filed: Apr. 28, 2000

(51) Int. Cl.$^7$ ................................................ G06F 17/30
(52) U.S. Cl. ........................... 707/10; 707/9; 709/225; 709/217; 709/229
(58) Field of Search ................................ 707/1, 3, 5, 4, 707/200, 103, 104, 9, 10; 701/207, 208; 713/201, 200; 709/328, 203, 225, 229, 217; 340/531, 541

(56) References Cited

U.S. PATENT DOCUMENTS

| | | | |
|---|---|---|---|
| 5,510,828 A | | 4/1996 | Lutterbach et al. |
| 5,696,898 A | * | 12/1997 | Baker et al. ................ 707/9 |
| 6,041,325 A | * | 3/2000 | Shah et al. ................ 345/744 |
| 6,067,531 A | * | 5/2000 | Hoyt et al. ................ 705/35 |

OTHER PUBLICATIONS

Weigang Wang, "Team and Tole Based organizational context anc access control for coorperative hypermedia environments", ACM, 1999, pp. 37–71.*
Hildman et al., "Managing trust between collaborating companies using outsourced Role Based Access Control", ACM 1999, pp. 105–111.*
Kieburtz et a., "Access Right Expressions", ACM, 1983, pp. 78–96☐☐☐☐.*
Lupu et al., "A policy Based Role Framework", ACM 1996, PP. 11–15–11–24.*
Airi Salminen, "Requirements for XML document database systems", ACM, pp. 85–94.*
Jaeger et al., "A role based Access control model for protection domain derivation", ACM 1997, pp. 95–106.*
Bullock et al., "An access control framwork for multi–user collaborative environments", ACM 1999, pp. 140–149.*
U.S. patent application Ser. No. 09/560,393, Brown, et al., filed Apr. 28, 2000.
B. R. Badrinath, "A WWW–Based Location–Dependent Information Service For Mobile Clients" Dec. 1, 1999, www.cs.rutgers.edu/.
eCommerce, Shopper's Eye: A very Personal Shopper, Dec. 1, 1999, www.ac.com/services/cstar/.
Andrew E. Fano, Shopper's Eye: Using Location–based Filtering for A Shopping Agent in the Physical World, May 10–13, 1998, p. 416–421.

* cited by examiner

*Primary Examiner*—Jean M. Corrielus
(74) *Attorney, Agent, or Firm*—Marilyn Smith Dawkins; Bracewell & Patterson, L.L.P.

(57) ABSTRACT

In accordance with the present invention, multiple authority-designated settings are accessed at an authority-enabled system via a network from a universally accessible database according to a particular universal identifier associated with a particular user. The particular user is only allowed access to a selection of multiple of types of content from the authority-enabled system that are enabled according to the authority-designated settings received at the authority-enabled system, such that an authority-enabled system enforces an authority-designated access policy for a particular user received via a universally accessible database.

36 Claims, 11 Drawing Sheets

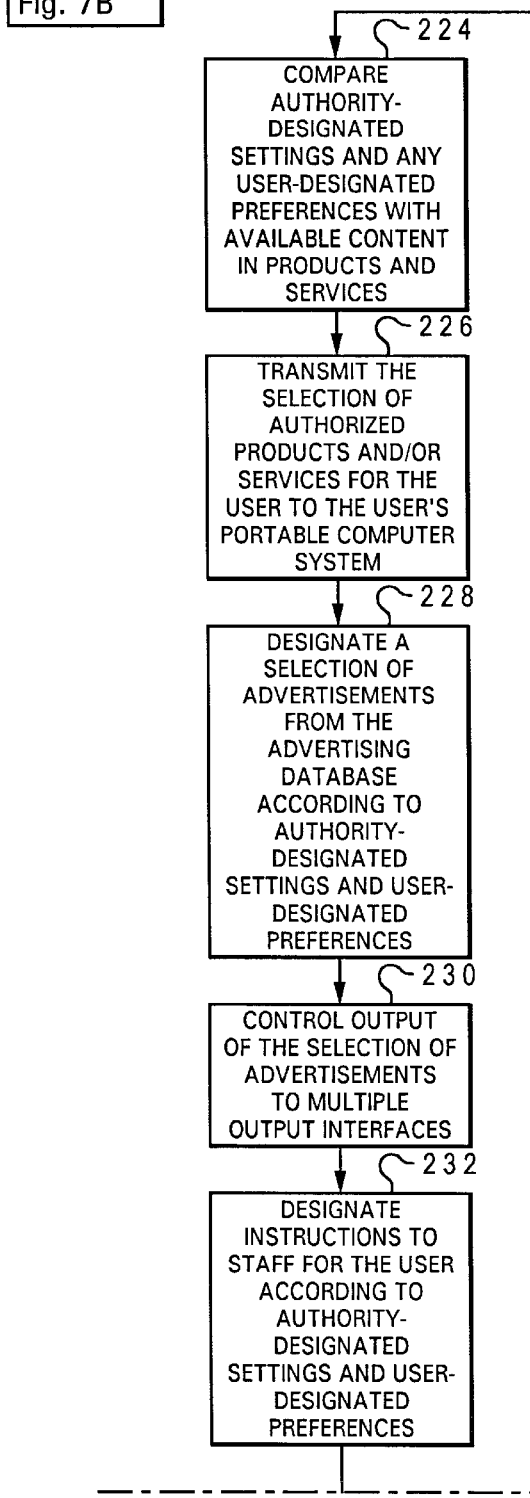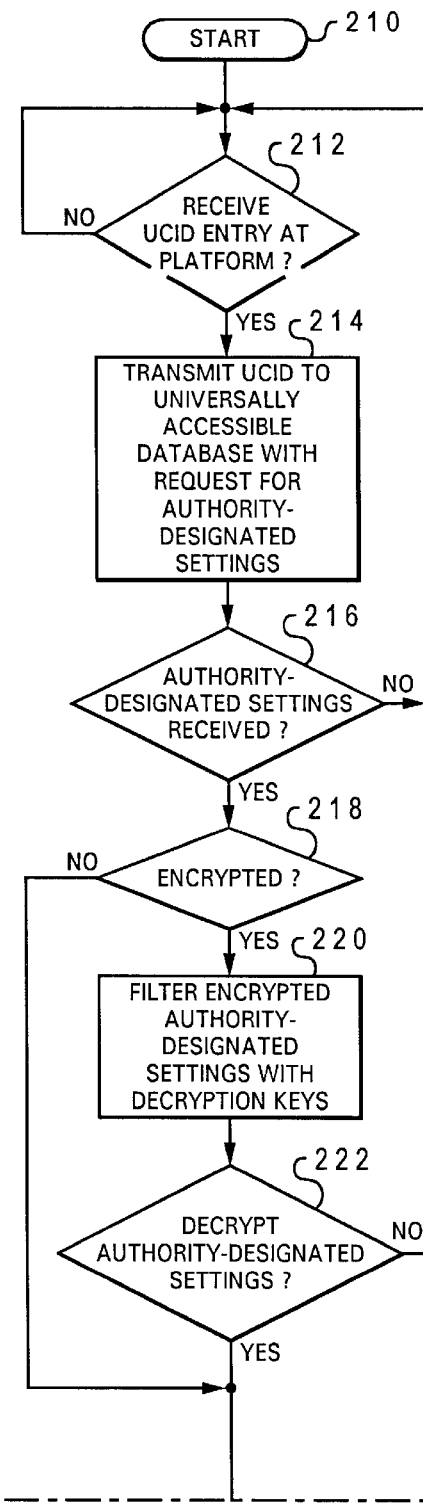

*Fig. 8A*

| Authority | Type of setting | Content designation |
|---|---|---|
| Parent A | Television | Access only to PG or less; Access for 1 hour daily |
| Parent B | Radio | Access only to classical or oldies radio stations |
| ... | ... | ... |
| Parent A | Books | Access only to Dr. Seuss books |
| Library A | Books | 2 book limit |

| Type of setting | Content designation |
|---|---|
| Television | Prefer cartoons |
| ... | ... |
| Radio | Oldies radio stations |

262

| Authority | Password | Authority designations | Authorization/Denial of Authorization Record | Location |
|---|---|---|---|---|
| Sylvia = parentA | Gen234  266 | Parent A, Parent B, Library, Babysitter A | 11/21/00-Received access to television show A for 30 minutes; | TV1 |
| .. | .. | .. | .. | .. |
| GeorgeG = parentB | asD25  266 | Parent A, Parent B, Business A | 11/21/00-Received access to oldies radio station for 10 minutes. | Car-radio1 |

MONITORING AND MANAGING USER ACCESS TO CONTENT VIA A UNIVERSALLY ACCESSIBLE DATABASE

CROSS-REFERENCE TO RELATED APPLICATION

The present application is related to the following application, which is filed on even date herewith and incorporated herein by reference:

(1) U.S. patent application Ser. No. 09/560,393.

BACKGROUND OF THE INVENTION

1. Technical Field

The present invention relates in general to an electronic chaperone and, in particular, to a method, system and program for electronically monitoring and managing user access to content via a universally accessible database. Still more particularly, the present invention relates to a method, system and program for managing user access to content according to access restrictions designated by an authority to the user associated with a particular universal identifier.

2. Description of the Related Art

As the tide is turning towards a paperless world, computers are becoming more prevalent for replacing many functions previously performed utilizing paper. In addition, networking computers in order to increase speeds of data transmittal has added the ability to allow multiple users to access a single database or other form of data.

Global positioning systems (GPSs) add to the applications of personal, portable computer systems. In the consumer world, as personal computer systems include GPSs and communicate to a network, personal computer systems may receive regionalized advertising and sale updates. For example, a shopper's eye system, incorporating a personal digital assistant (PDA) equipped with a GPS and wireless Internet Protocol (IP), enables a two-way channel with a central control center through which retailers can present customized offers to nearby shoppers based on their particular interests. In particular, the location of a user, shopping goals, preferences and related history may be detected by a central control center for a mall the user has entered. This information is routed to stores in the mall and as the stores receive this information, they may create a customized offer of bundled goods and services. The offer is transmitted from the central control center to the user's PDA.

Accountability of users for entering a particular store or office, seeing particular images, visiting particular web sites, eating particular foods, etc. has been a long time struggle for parents who cannot attend to their children all the time and companies who cannot personally monitor employees all the time. In particular, accountability for content viewed on a computer or television has led to software applications that allow a parent or employer to lock out certain types of web site's and television stations and/or monitor use. However, while these software applications, associated with the computer or television, monitor and limit access on that computer or television, they do not monitor and limit access on all computers or televisions that a particular user may have access to. In addition, there are typically areas other than content of web sites and television programs that a parent or company would like to monitor.

In view of the foregoing, it would be preferable to provide a universally accessible database according to a universal identifier associated with a user as an electronic chaperone that includes multiple types of authority-designated settings for multiple diverse events that are transmittable to multiple diverse access platforms in order to universally enforce an authority-designated access policy. In addition, it would be preferable to allow a user to designate multiple diverse preferences. It would be advantageous to transmit the authority-designated settings to multiple diverse locations and/or devices, such as retailers, in order that the retailer can determine and transmit to the electronic chaperone a suitable selection of products and services provided by the retailer or media provider according to the authority-designated preferences. In addition, it would be preferable to transmit the authority-designated settings to a device, such as a television, in order that the authority-designated settings are automatically transferred to the television's parental control application settings, for example.

SUMMARY OF THE INVENTION

In view of the foregoing, it is therefore an object of the present invention to provide an electronic chaperone.

It is another object of the present invention to provide an improved method, system and program for electronically monitoring and managing user access to content via a universally accessible database.

It is yet another object of the present invention to provide an improved method, system and program for managing user access to content according to access restrictions designated by an authority to the user associated with a particular universal identifier.

In accordance with the present invention, multiple authority-designated settings are accessed at an authority-enabled system via a network from a universally accessible database according to a particular universal identifier associated with a particular user. The particular user is only allowed access to a selection of multiple of types of content from the authority-enabled system that are enabled according to the authority-designated settings received at the authority-enabled system, such that an authority-enabled system enforces an authority-designated access policy for a particular user received via a universally accessible database.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 illustrates a pictorial illustration of multiple data storage structures for storing authority-designated settings and other data in accordance with the method, system and program of the present invention.

DETAILED DESCRIPTION OF PREFERRED EMBODIMENT

The present invention may be executed in a variety of systems, including a variety of computers under a number of different operating systems. In a preferred embodiment of the present invention, a system of network servers, such as Netfinity™ servers (Netfinity™ is a trademark of International Business Machines Corp.) and other data processing systems connected to a network are utilized to house a universally accessible database. A computer system has access to the network servers. The computer system may be, for example, a desktop computer, a network computer, a portable computer, a midrange computer or a mainframe computer. In addition, the computer system may be part of a network such as a local-area network (LAN) or a wide-area network (WAN). Therefore, in general, the present invention is preferably executed in a computer system that performs computing tasks such as manipulating data in storage that is accessible to the computer system. In addition, the computer system includes at least one output device and at least one input device.

Figure 1:
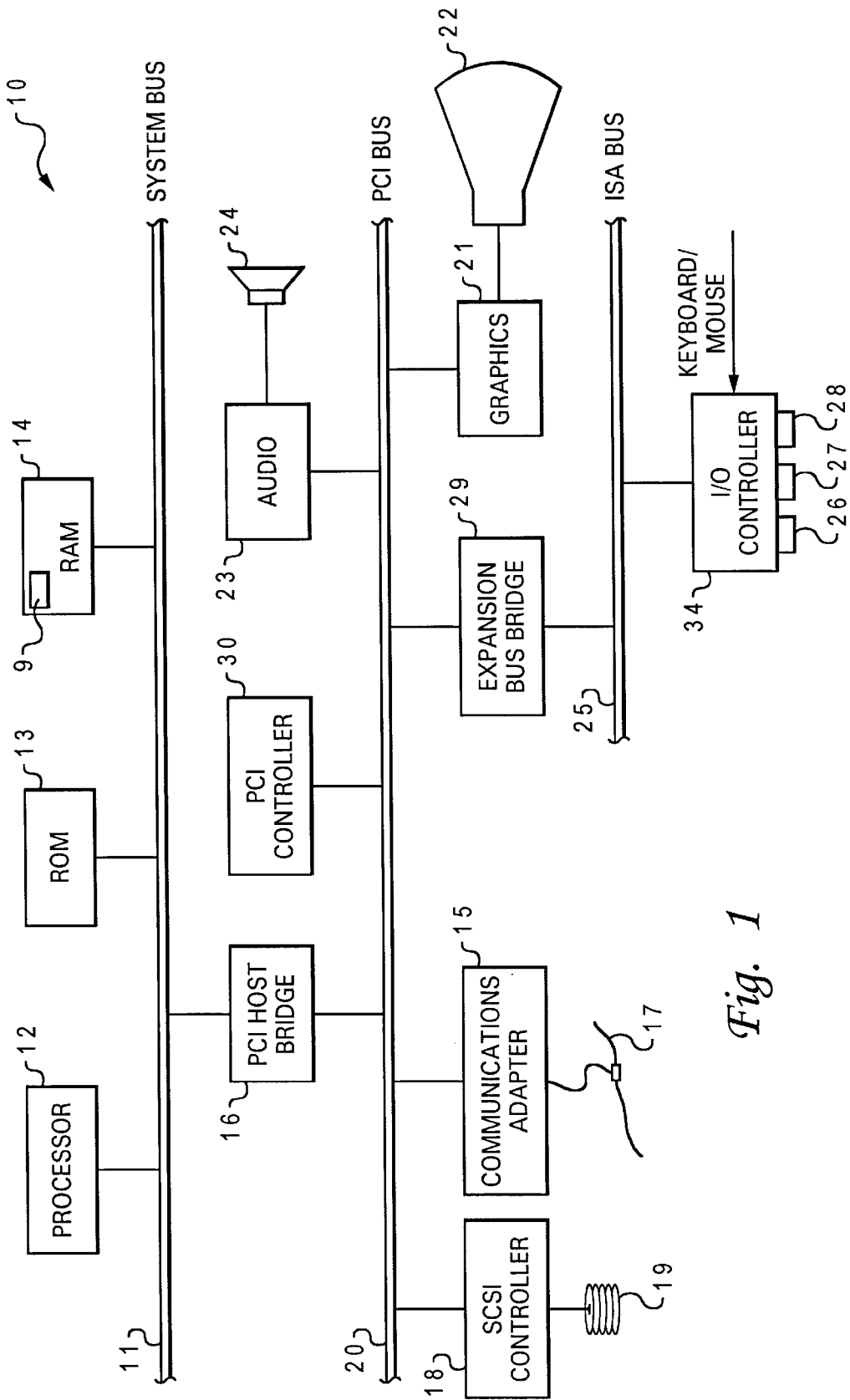
FIG. 1 is an illustrative embodiment of a data processing system with which the method, system and program of the present invention may advantageously be utilized.

Referring now to the drawings and in particular to FIG. 1, there is depicted a block diagram of one embodiment of a computer system that may utilize the present invention. As depicted, data processing system 10 includes at least one processor 12, which is coupled to system bus 11. Each processor 12 is a general-purpose processor, such as IBM's PowerPC™ processor that, during normal operation, processes data under the control of operating system and application software stored in random access memory (RAM) 14 and Read Only Memory (ROM) 13. The operating system preferably provides a graphical user interface (GUI) to the user. Application software contains instructions that when executed on processor 12 carry out the operations depicted in the flowcharts of FIGS. 5, 6, 7, and others described herein.

Processors 12 are coupled via system bus 11 and Peripheral Component Interconnect (PCI) host bridge 16 to PCI local bus 20. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

PCI local bus 20 interconnects a number of devices for communication under the control of PCI controller 30. These devices include a Small Computer System Interface (SCSI) controller 18, which provides an interface to SCSI hard disk 19, and communications adapter(s) 15, which interface data processing system 10 to at least one data communication network 17 comprising wired and/or wireless network communications. In addition, an audio adapter 23 is attached to PCI local bus 20 for controlling audio output through speaker 24. A graphics adapter 21 is also attached to PCI local bus 20 for controlling visual output through display monitor 22. In alternate embodiments of the present invention, additional peripheral components may be added. For example, in alternate embodiments, a tactile display component may be provided.

PCI local bus 20 is further coupled to an Industry Standard Architecture (ISA) bus 25 by an expansion bus bridge 29. As shown, ISA bus 25 has an attached I/O (Input/Output) controller 34 that interfaces data processing system 10 to peripheral input devices such as a keyboard and mouse (not illustrated) and supports external communication via parallel, serial and universal serial bus (USB) ports 26, 27, and 28, respectively.

Figure 2:
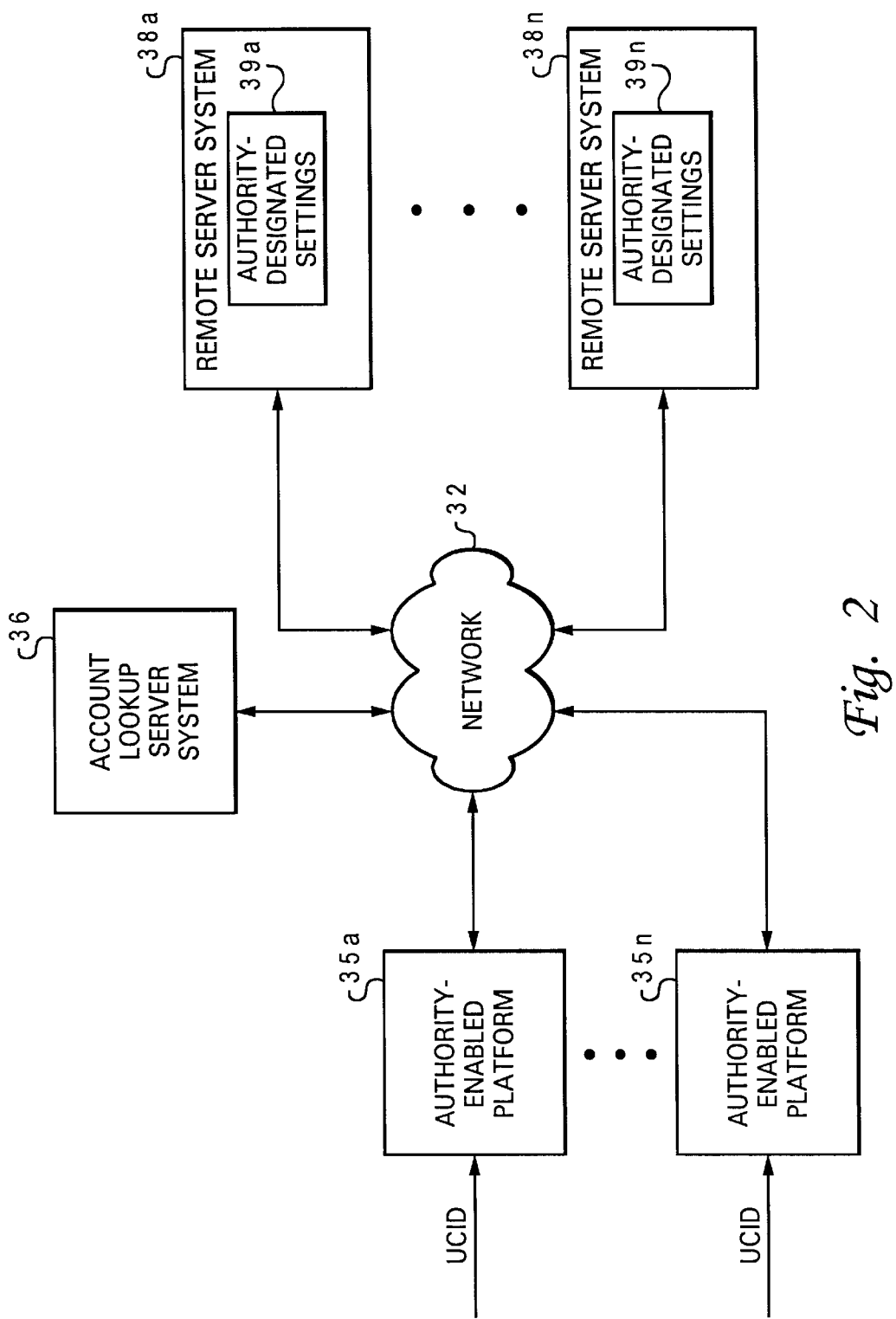
FIG. 2 illustrates a high level block diagram of one embodiment of an electronic chaperone management system in accordance with the method, system and program of the present invention.

With reference now to FIG. 2, there is illustrated a high level block diagram of one embodiment of an electronic chaperone management system in accordance with the method, system and program of the present invention. As depicted, multiple diverse authority enabled platforms 35a–35n communicate with account lookup server system 36 and multiple remote server systems 38a–38n via a communications medium to a network 32 (or across a communication interface).

The communications medium may comprise wired or wireless communications or other communications media that enables transmission of data. Moreover, the communications medium preferably comprises a link to network 32, such as the Internet or other universally accessible network.

Data exchange across the communications medium is advantageously performed in at least one of multiple available data transmission protocols and is preferably supported by a common data structure format, such as the extensible mark-up language (XML) data structure format. Data transmission protocols may include, but are not limited to, Transmission Control Protocol (TCP), Internet Protocol (IP), Hypertext Transfer Protocol (HTTP), and Bluetooth. In addition, data may be transmitted in a secure manner via encryption or by technologies, such as secure socket layer (SSL) or virtual private networks (VPN).

An example of an XML data file that might be transmitted from any of authority designated settings 39a–39n of remote server systems 38a–38n to any of authority-enabled platforms 35a–35n, as depicted below, preferably contains data that is distinguished by attributes on elements and may be wrappered within a larger element. The elements, format of the elements and data included with the elements is provided to depict examples and is not intended to limit the types of elements, format of elements or data included with elements that are in an XML data file. For example, the data attributed to element "<TimeStamp> </TimeStamp>" designates the time that the data was attributed to the XML data file.

<ACCESS TimeStamp="888965153" UCID="Matilda" Authority="Mom" TelevisionRatingLimit="PG" TelevisionTimeLimit="1 hour" TelevisionContent= "Educational" TelevisionContent="Cartoon">

A second example of the same data in an alternate XML data format that includes elements is illustrated below:

<TimeStamp>888965153</TimeStamp>
    <UCID>Matilda</UCID>
    <Authority>Mom</Authority>
    <TelevisionRatingLimit>PG</TelevisionRatingLimit>

\<TelevisionTimeLimit\>1 hour\</TelevisionTimeLimit\>
\<TelevisionContent\>Educational\</TelevisionContent\>
\<TelevisionContent\>Cartoon\</TelevisionContent\>

In particular, in the examples, a user with a universal communications identifier (UCID) "Matilda" is given television access to shows that are rated parental guidance (PG) or lower for up to an hour a day. The user may watch shows with content that is rated educational or as a cartoon. These access limits may be designated by a parent or guardian "mom" in order to limit television access by the user.

In the example of the XML data format as the common transmittable data format, a data validation file such as a document type definition (DTD) or schema is preferably utilized to validate XML data files. In addition, a schema preferably translates multiple XML data files. Moreover, a style sheet such as an extensible style sheet language (XSL) file is preferably utilized to provide a style specification for the XML data at the receiving system. In particular, DTDs, schemas, and XSL files may be, for example, transmitted with an XML data file to a receiving system or downloaded at the receiving system from an alternate source. In the present example, the DTD or schema would verify that all the data required for authority designated access is included in the XML data file.

Data transmission across the communications medium to network 32 may advantageously be initiated by any of authority-enabled platforms 35a–35n by transmitting a UCID to account lookup server system 36 via network 32. The UCID, which is preferably an alphanumeric identifier, such as a web page address, associated with a particular user or users, is preferably included in a directory of multiple UCIDs accessible via account lookup server system 36. The directory preferably comprises a database matching each UCID with an address of a particular remote server system from among remote server systems 38a–38n that is accessed according to the UCID. Remote server systems 38a–38n may include systems including, but not limited to, network servers, web application servers, host storage servers, and home computers.

A UCID may be received at any of authority-enabled platforms 35a–35n via multiple input media. For example, a UCID may be transmitted from a portable computer system to any of authority-enabled platforms 35a–35n via an RF or other wireless transmission. In another example, a UCID may be received at authority-enabled platforms 35a35n from a personal storage device proffered by a particular user at a personal storage device adapter coupled to any of authority-enabled platforms 35a–35n. In yet another example, an input interface, such as a keyboard, may be provided at any of authority-enabled platforms 35a–35n for entry of a UCID.

Authority-enabled platforms 35a–35n preferably represent independent devices that may each control access to particular types of content by a particular user according to authority designated settings for the user received from one of remote server systems 38a–38n in response to transmitting a particular UCID. Examples of authority-enabled platforms 35a–35n may include, but are not limited to, computer systems, televisions, security systems and retailer systems. Content may include, but is not limited to, graphical images., audio sounds, products, locations, data, and other types of access-controllable items.

Each of authority-enabled platforms 35a–35n advantageously includes at least one detector(not shown), such as a video detector, for sensing the number of users within a particular proximity of each of the platforms. In order for access to be obtained to the devices, the devices may required that authority-designated settings for each of the detected users are received from looking up a UCID for each of the detected users.

Each of remote servers systems 38a–38n may include authority-designated settings 39a–39n, wherein each set of authority-designated settings is accessible according to a particular UCID and is set according to an authority or multiple authorities over a particular user associated with the UCID. In particular, an authority over a user that sets authority-designated settings for the user may include any individual or organization which has authority over a user. For example, a parent, teacher, business, volunteer organization or government may have authority over a user.

Figure 3A:
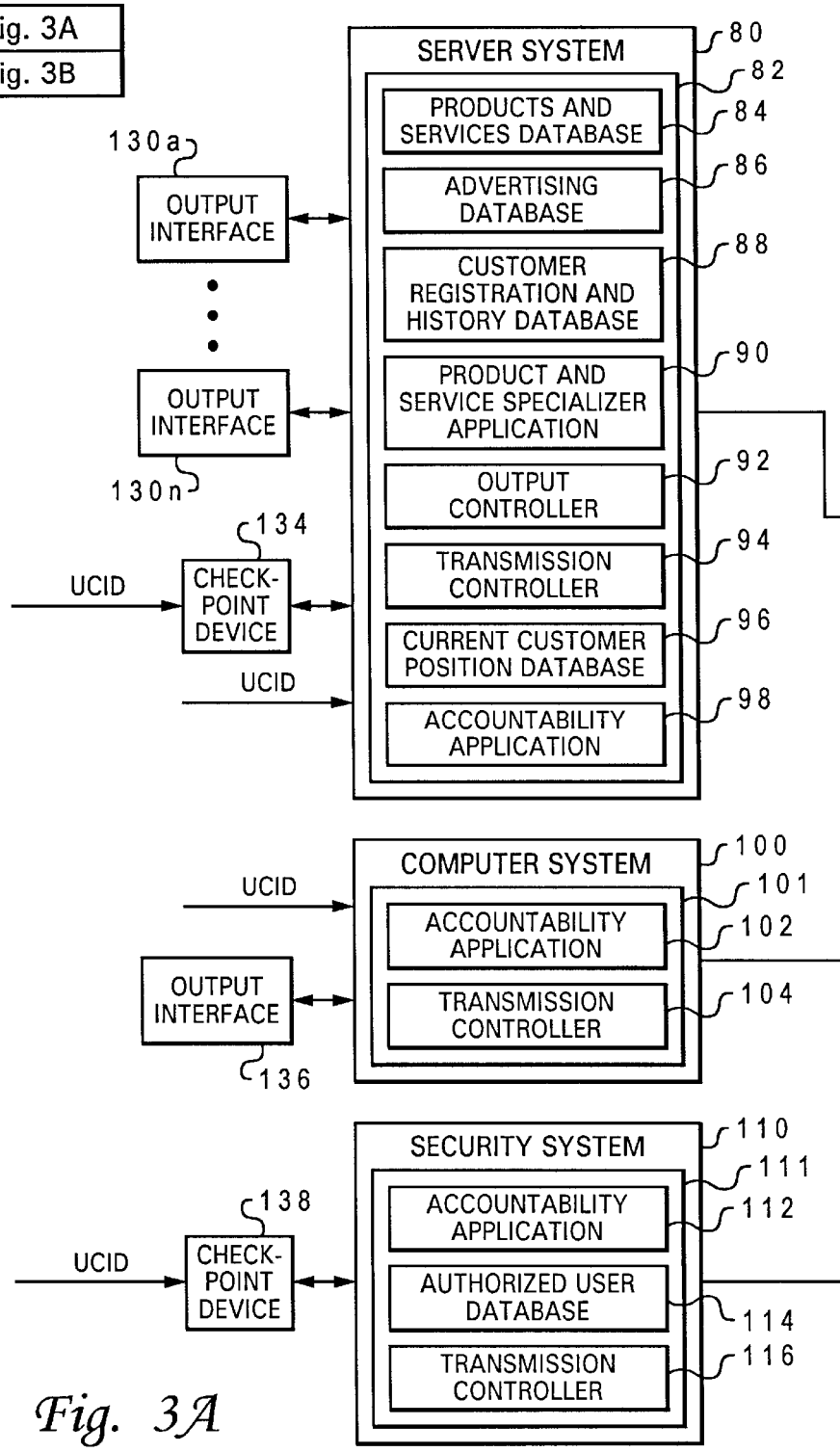
FIG. 3 depicts a detailed block diagram of one embodiment of an electronic chaperone management system in accordance with the method, system and program of the present invention.
Figure 3B:
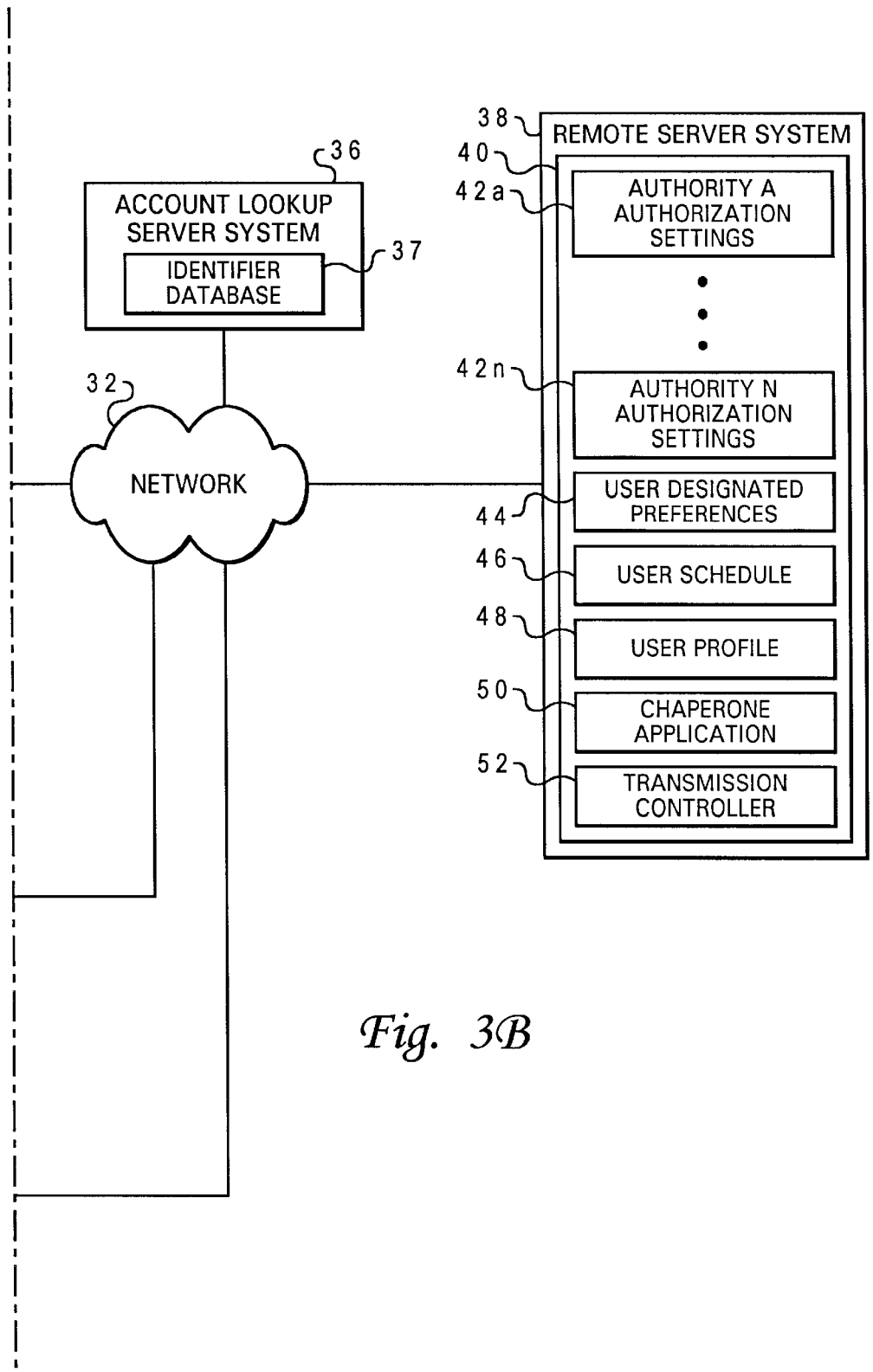

Referring now to FIG. 3, there is depicted a detailed block diagram of one embodiment of an electronic chaperone management system in accordance with the method, system and program of the present invention. In the embodiment, a server system 80 is advantageously an authority-enabled platform that supports electronic business for a particular retailer or consumer provider.

In the present example, server system 80 includes electronic business related data, services and applications stored in a data storage medium 82 including a products and services database 84, an advertising database 86, a customer registration and purchase history database 88, a product and service specifier application 90, an output controller 92, a transmission controller 94, a current customer database 96, and an accountability application 98. The databases are preferably data storage structures that hold multiple entries and may be searched and/or filtered according to particular criteria. In addition, in an alternate embodiment, alternate types of data may be stored in data storage medium 82. Moreover, in an alternate embodiment, additional services and applications may be stored in data storage medium 82.

Server system 80 controls exchange of data to and from network 32 by transmission controller 94. In particular, transmission controller 94 establishes a connection via the communication medium with a particular remote server system via a UCID lookup in account lookup system 36 such that authority-designated settings and user-designated preferences stored according to the UCID may be retrieved at server system 80.

A user may provide a UCID to server system 80 via a check point device 134. Check point device 134 may be located at a remote location from server system 80 and is utilized at a check-in or check-out point to control access to content by a user in coordination with accountability application 98.

For example, at a check-out register, a UCID may be required for entry at check-point device 134 by the user attempting to purchase a particular book. The authority-designated settings for the particular user are retrieved according to the UCID at server system 80 and compared with products and services database 84 by product and service specializer application 90. Product and service specializer application 90 determines which products and services are accessible to a particular user according to the authority-designated preferences. Accountability application 98 compares the product requested for purchase by the user with the authority-designated products and services and controls an access signal to check-point device 134 indicating whether or not the user is allowed access to purchase the particular book according to the authority-designated settings.

Multiple users may access a particular server system 80 simultaneously. For example, a store with four registers may include a check-point device at each register that is connected to server system 80. Each UCID that is currently in use is preferably monitored in current customer position database 96, wherein the check-point device at which the customer is located is recorded with the customer's UCID.

Server system 80 also controls output of data to multiple diverse output interfaces 130a–130n via output controller 92. Output controller 92 may control transmission of data to multiple diverse output interfaces 130a–130n via a wired or wireless communication medium. The diverse output interfaces may include, but are not limited to, output interfaces within a store for advertising, output interfaces within a store for displaying data to employees only, output interfaces within a shopping arena, and output interfaces along a road-side.

Output interfaces 130a–130n may include multiple diverse types of output devices including, but not limited to, flat-screen monitors, LCD graphical displays, electronic paper displays, electronic billboard displays, tactile-detectable displays, audio speakers, printers, and other forms of electronic media output devices.

Products and services database 84 preferable comprises multiple types of content provided by a retailer or consumer provider including diverse products and services. The products and services may include, for example, multiple types of descriptors, prices and conditions. For example, the products and services for a movie theater may include a listing of current movie titles, ratings, descriptions, reviews, etc. In addition, the products and services for a movie theater may include a listing of current refreshments and candies with prices and food content breakdown.

Advertising database 86 preferably comprises multiple electronic advertisements including graphical rendering, audio and video. For example, the movie theater advertising database 86 may include a video commercial of a new movie title. In addition, the movie theater advertising database 86 may include graphical advertising for refreshments, including audio advertising for the refreshments. The electronic advertisements stored in advertising database 86 may be stored according to multiple searchable keywords.

Customer registration and history database 88 preferably includes registration data for multiple users and any purchase history as a registered user. Preferably, the UCID received at server system 80 is utilized to access a registration and purchase history for a particular user. For example, for each customer purchase a history of the date, time, place, sales person, price paid, etc. associated with the purchase is preferably automatically recorded in customer registration and history database 88.

Product and service specifier application (PSA) 90 preferably analyzes authority-designated settings and user-designated preferences when received from remote server system 38 according to a particular UCID. First, PSA 90 may determine a selection of products and services from among products and services database 84 that meet the authority-designated settings and user-designated preferences for the user. In addition, the selection of products and services from among products and services database 84 may be further specified according to the user's purchase history, schedule, user profile and current location. The selection of specified products and services may include photo, video and audio clippings in addition to descriptions and prices.

Transmission controller 94 preferably controls secure transmission of the selection of specified products and services to a user's computer system via a network or to one of output interfaces 130a–130n that is accessible to the user. In addition, the specified products and services may advantageously include electronic coupons and rebates for use when purchasing the products or services at the venue or on-line.

In the example of a movie theater, a parent, as an authority to a child, may designate a setting for no movies or television greater that a "PG" rating on the child's authority-designated settings at a UCID associated with the child. The child may designate a preference for comedies. Therefore, PSA 90 for a movie theater server system 80 would receive the parent-designated setting and child-designated preference and search the movie theater products and services database 84 for movies that are rated "PG" or less and are comedies. A selection of movie listings that first meet the parental setting and then meet the child preference is transmitted to an output interface accessible to the child or to the child's computer system where an output interface is provided by the child's computer system for output of the selection of movie listings.

A second function of PSA 90 is determining service and product recommendations to a retailer staff. Service and product recommendation to a retailer staff may be determined from the authority-designated settings and user-designated preferences, location, registration, previous purchases, the store's customer service policy and available products and services. Output controller 92 preferably controls distribution of service and product recommendations to output interfaces from among output interface 130a–130n that are accessible only by staff.

For example, a parent designates that a child should have no snacks after 2 PM and an hour long nap on the child's authority-designated settings accessible according to a UCID associated with the child. When the child is dropped off at a child-care school, the server system for the child care school is provided with the child's UCID whereby the child care school's server detects the parent-designated preferences for the child from the child's UCID account and alerts staff of the parental requests, for example, at a display device accessible to the staff-only or through a printed copy.

A third function of PSA 90 is determining which advertising selections from advertising database 86 to display in a store, in an open arena, on the road-side and on-line. Advertising selections are preferably determined by PSA 90 according to the type of output interface and according to authority-designated settings and user-deslignated preferences and settings in current customer database 96. For example, an authority may designate on a child's authority-designated settings that a child should not be shown electronic advertising for cigarettes. Preferably, PSA 90 would determine alternate types of electronic advertising that do not include cigarettes when the presence of the child is detected within a particular proximity, even if the child has programmed a preference for cigarettes.

In another example of an application of the present invention, an amusement park may include check-point device 134 at each ride for requiring entry of a UCID and payment authorization prior to entering the ride. At each check-point device, the authority-designated settings of types of rides allowed, types of content allowed, age of the user, medical conditions, etc. for the user would be transmitted from remote server system 38 in accordance with the UCID to server system 80. PSA 90 would determine acceptable products and services for the user according to authority-designated settings and accountability application 98 would determine whether access to that particular ride is provided for by the products and services determined by PSA 90. If access is permitted, accountability application 98 would transmit an authorization signal to the check-point device to allow access to the user. In addition, a user account may be debited at each check point device, such that the user pays as they ride.

In yet another example, a library may include a checkpoint device at each check-out point where a user is required to provide a UCID in order to check-out books. PSA 90 would determine which books in inventory contain content that is acceptable in view of the authority-designated settings retrieved according to the UCID and accountability application 98 would verify that each book requested for check-out by the user is authorized according to the content selections by PSA 90. Content selections may include authorizations such as content topics and reading levels. The authority-designated settings for a library check-out may be designated, for example, by a parent or guardian for a child or by the library. For example, if a user repeatedly checks-out large volumes of new books and returns the new books late, the library may designate at the user's authority-designated settings that the user may only check out a particular number of books within a particular time period. If for example, the user went to another library, the alternate library would detect the library-designated setting for the user according to the UCID and restrict the user to the limited number of check-outs as well.

A UCID account accessed at data storage medium 40 or remote server system 38 advantageously includes multiple authority-designated settings and user-designated preferences recorded in a single database or multiple databases and applications stored in data storage medium 40. In the present example data storage medium 40 is depicted as internally accessible to remote server system 38, however in alternate embodiments, data storage medium 40 may be accessible externally or remotely.

In the example illustrated, authority-designated settings include authority A authorization settings 42a through authority N authorization settings 42n. Included in the authorization settings may be access settings for budget preferences, location preferences, visual preferences, broadcast preferences, etc. In addition, authorization settings may designate who alternate authorities may be. For example, a parent may designate that only a teacher or a selection of family friends may include authorization settings at a child's UCID account.

Each authority preferably provides a secured listing of authorization settings to a particular UCID account where only that authority is enabled to adjust the authorization settings. For example, a parent may designate multiple levels of authorization for a child at an amusement park. The child may be restricted from leaving a particular area of the park, and may be restricted from particular types of rides. Attempts to adjust authority settings 42a–42n by a non-authority preferably result in revoking access to any authority settings until reset by a primary authority.

Advantageously, in addition to determining authority-designated settings an authority may directly access particular portions of data stored according to a UCID. Preferably, data received at remote server system 38 in response to access or denial of access to content is recorded in authorization settings 42a–42n according to the authority that designated the authorization settings utilized. For example, if a parent designates authorization settings for television viewing for a child, then a recording of accesses to television stored according to the child's UCID is preferably retrievable by the parent.

In addition, advantageously, an authority may remotely adjust authority-designated settings. A user may transmit a request to an authority at a data processing system that is accessible to the authority. The authority may designate a one-time access, multiple accesses or change authority-designated settings remotely and transmit the designations to a particular UCID account. For example, a television authority-designated setting may restrict a child from watching television that is rated higher than PG, however a special is coming on television that is rated PG-17 that the child requests to watch based on educational value. The child's request may be transmitted to a parent's computer at work where the parent designates a one-time authorization for the show and transmits the authorization to the child's UCID account.

In another example, a child may go with a friend to a new theme park where there are not authority-designated settings at the child's UCID account to allow the child to enter. The child's UCID account would receive a listing of products and services for the theme park that is transmittable to an authority at a remote computer system. The authority, such as the parent, could view the products and services and transmit a selection of authority-designated settings to the child's UCID account such that the child can be permitted access into the theme park.

In addition to including authority-designated settings and user-designated preferences on data storage medium 40 according to a particular UCID, a user's schedule 46 and user profile 48 are preferably included. Schedule 46 preferably includes an electronic calendar of events, appointments and tasks. User profile 48 preferably includes personal data about the user such as name, age, home data, work data, payment account information, marital status, primary language, children, etc. In addition, user profile 48 may include encrypted registration ID's for various retailers as a result of the user registering with the retailer that can be easily decrypted by the retailer's server system. Moreover, user profile 48 may include cookies from registration with multiple retailers.

In addition, data storage medium 40 according to a particular UCID includes a chaperone application 50 that responds to data received and requested from other data processing systems, including server system 80 and security system 33. In addition, chaperone application 50 provides analysis of products and services provided by server system 80 in view of authorization settings 42a–42n, user designated preferences 44, schedule 46, user profile 48, and other data stored according to the UCID. In addition, chaperone application 50 controls whether or not authorization settings 42a–42n are transmitted to a particular platform according to the type of platform requesting authorization settings 42a–42n. Authorization settings 42a–42n may include particular types of platforms to which authorization settings 42a–42n are not transmittable. For example, a parent may designate that authorization settings 42a–42n are not transmittable to a particular store at which the parent has restricted a child from making purchases, such that the child is denied purchase of any product or receipt of service at the store.

In other examples of platforms with access to UCID accounts via network 32, computer system 100 includes a data storage medium 101 comprising an accountability application 102 and a transmission controller 104. Accountability application 102 preferably controls access to content provided by computer system 100 according to authority-designated settings received according to a particular UCID. Preferably, prior to use of computer system 100, authority-designated setting are required to be retrieved at computer system 100 from remote server system 38 in association with a particular UCID. Transmission controller 104 preferably controls transmission of monitored usage of computer system 100 to remote server system 38 in accordance with the particular UCID.

According to the authority-designated settings, accountability application 102 specializes the access that the user is provided via an output interface 136 of computer system 100. For example, if an authority-designated setting limits usage of the Internet for that day for that user to one hour, and forty-five minutes of usage have been recorded, then accountability application 102 would limit usage of the Internet to fifteen more minutes and would then control transmission of a recording of time spent on the Internet to remote server system 38 in accordance with the particular UCID. In another example, an authority-designated setting may limit the user from accessing electronic games as applications executing on computer system 100 or executing on a network server accessed from computer system 100.

In yet another example of platforms with access to UCID accounts via network 32, security system 110 includes a data storage medium 111 that may be internally or remotely accessible comprising accountability application 112, authorized user database 114 and transmission controller 116. Accountability application 112 preferably controls access to a location protected by security system 110 according to authority-designated settings. Preferably, security system 110 requires authority-designated settings from remote server system in accordance with a particular UCID account in order to determine access to a particular location. A UCID may be entered at a check-point device 138 remotely connected to security system 110. In addition, authorized user database 114 may include biometric or other personalized data for authorized user's that is required for access. For example, a user may be required to pass a biometric scan and transmit authority-designated settings to security system 33. Thereby, if an employee needs special access to a particular part of the building on a particular day, authority-designated settings for that access may be transmitted to the employee's UCID account, however the employee must also pass the biometric scan for entry. Transmission controller 116 advantageously controls transmission of entry records, such as data, time and location of entry, to remote server system 38 in accordance with a particular UCID.

Advantageously, as is depicted in the present embodiment, authority-enabled platforms such as server system 80, computer system 31, security system 33 and others such as television and radio, include an accountability application that resides at the platform. However, if a platform does not include an accountability application, an accountability application may be transmitted with the authority-designated settings from remote server system 38 in accordance with a particular UCID.

In another example of one of the multiple applications of the present invention, a company that is sending representatives to a conference may be required to have the representatives sign non-disclosure agreements prior to attending the conference and receive company authorization to be in attendance. After an authorized representative signs the papers, a company transmits an encrypted authority-designated setting to the representative's UCID account that includes verification of the signature and provides authorization for the representative to attend the conference. In addition, the company transmits a decryption key to a server system that will control access to the conference. When the representative arrives at the conference, the encrypted authority-designated setting that authorizes the representative is preferably accessed from the representative's UCID account at the server system that has access to the decryption key. The authority-designated setting is decrypted and the server system indicates that the user is authorized for attendance-and may then authorize printing a badge for the representative or transmitting an electronic pass to the representative's UCID account or to a personals storage device that is required by security systems located at each room of the convention for access to the room.

Figure 4:
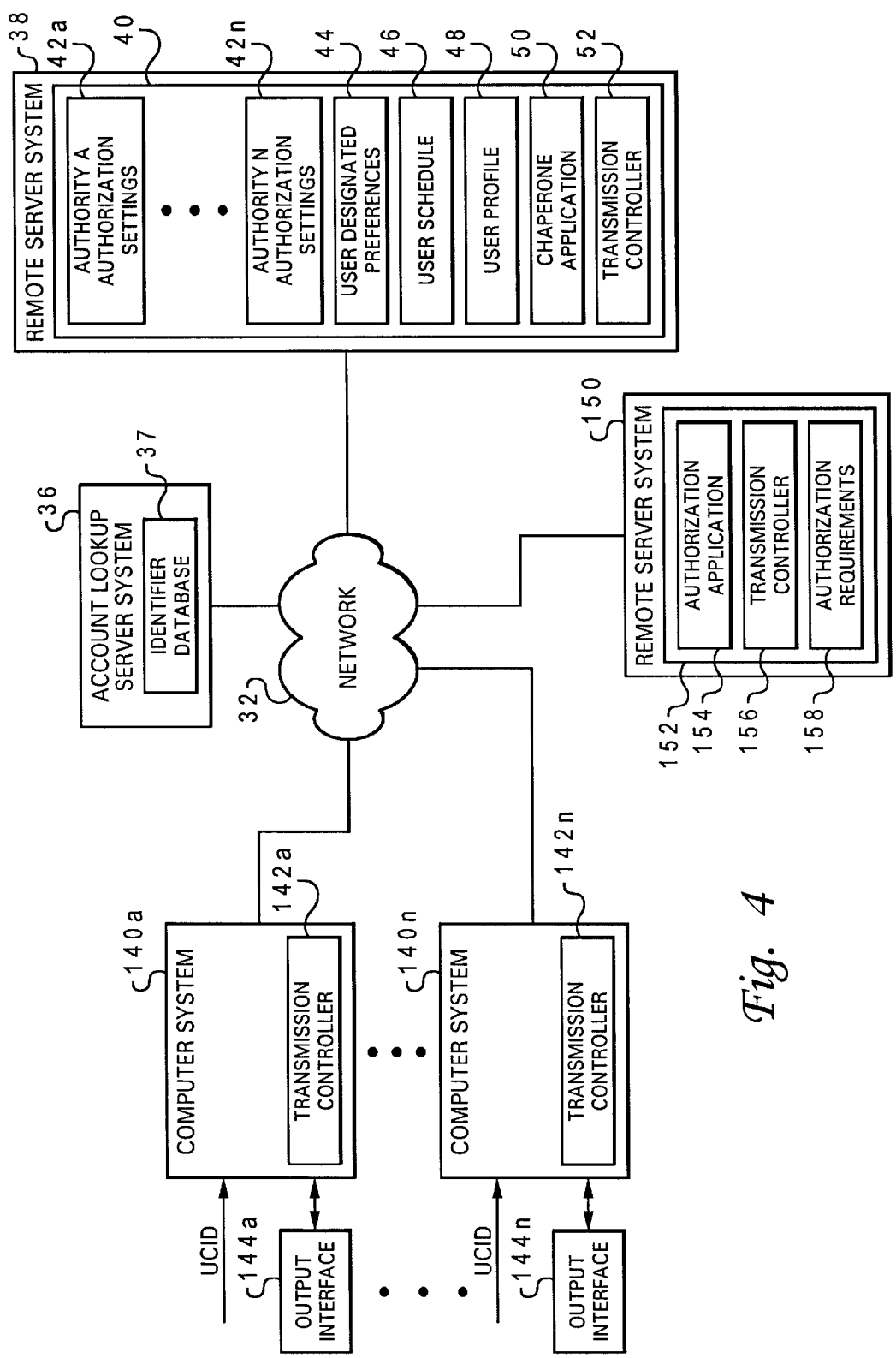
FIG. 4 illustrates a detailed block diagram of a second embodiment of an electronic chaperone management system

With reference now to FIG. 4, there is depicted a detailed block diagram of a second embodiment of an electronic chaperone management system in accordance with the method, system and program of the present invention. As depicted, multiple computer systems 140a–140n access network 32. Computer systems 140–140n respectively include transmission controllers 142a–142n, where each transmission controller controls transmission of data between the respective computer system and network 32. In addition, computer systems 140a–140n respectively output data to output interfaces 144a–144n.

Each of computer systems 140a–140n is preferably remotely controlled via remote server system 150 that is accessible according to a particular UCID. Remote server system 150 advantageously controls usage of computer systems 140a–140n according to authority-designated settings according to a particular UCID and provides accessing to applications, data and processing power. For example, computer system 140a–140n may be dumb terminals where the majority of the processing power for the computers is provided by remote server system 150.

Remote server system 152 accesses a data storage medium 152 that includes an authorization application 154, a transmission controller 156 and a database of authorization requirements 158. In the present embodiment data storage medium 152 is depicted as internally accessible to remote server system 150, however in alternate embodiments data storage medium 152 may be externally or remotely accessible.

Authorization requirements 158 preferably includes requirements for accessing any of computer systems 140a–140n. For example, authorization requirements 158 may include a list of employees that may be allowed access to each of computer systems 140a–140n. In another example, authorization requirements 158 may require particular types of authority-designated settings for a user accessing any of computers systems 140a–140n, such as a setting authorizing Internet access.

A UCID for a particular user entered at any of computer systems 140a–140n for access thereto is advantageously transmitted to remote server system 150. Remote server system 150 then accesses the authority-designated settings and other data associated with a particular user according to the user's UCID. Authorization application 154 controls usage of computer systems 140a–140n according to the authority-designated settings for the user. Transmission controller 156 controls transmissions to the computer system in use by the user and controls transmissions of monitored usage of the computer system to remote server system 38 according to the UCID for the user.

An example of an application of the present invention includes a computer lab where a user must pay for usage of a computer and/or of a specific application accessible from the computer. For example, a user may pay a first fee for computer usage time and a second fee for accessing a particular game at the computer. A user may be required to provide a credit card or UCID account with a payment account to remote server system 150 that controls computer systems 140a–140n in the lab. Upon receiving a form of payment, the user's UCID is added to a list of authorized users in authorization requirements 158. The user may select any computer in lab and enter his/her UCID at the computer to receive access. In addition, the user's authority-designated settings are accessed according to the UCID and utilized by authorization application 154 to control content accessible to the user at the computer system.

Figure 5:
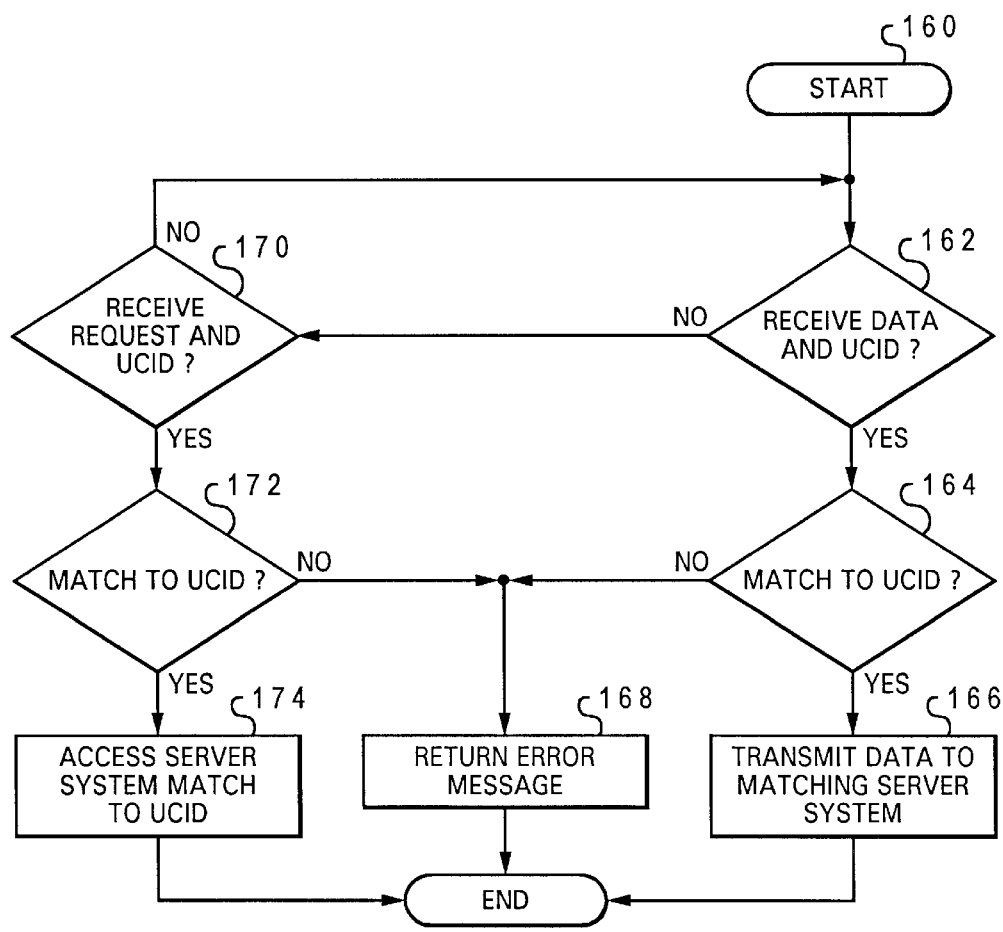
FIG. 5 depicts a high level logic flowchart of a process and program for controlling access to a universally accessible server system via a universally accessible database in accordance with the present invention.

Referring now to FIG. 5, there is illustrated a high level logic flowchart of a process and program for controlling access to a universally accessible server system via a universally accessible database in accordance with the present invention. As illustrated, the process starts at block 160 and thereafter proceeds to block 162. Block 162 depicts a determination as to whether or not data and a UCID are received at a universally accessible database. If data and a UCID are not received, then the process passes to block 170. If data and a UCID are received, then the process passes to block 164. Block 164 illustrates a determination as to whether or not a match to the UCID is found in the UCID directory of the universally accessible database. If a match is not found, then the process passes to block 168. Block 168 depicts returning an error message; and the process ends. If a match is found, then the process passes to block 166. Block 166 illustrates transmitting the data to the matching universally accessible remote server system; and the process ends.

Block 170 depicts a determination as to whether or not a request for data and a UCID are received at the universally accessible database. If a request for data and UCID are not received, then the process passes to block 162. If a request for data and UCID are received, then the process passes to block 172. Block 172 illustrates a determination as to whether or not a match to the UCID is found in the UCID directory of the universally accessible database. If a match is not found, then the process passes to block 168. If a match is found, then the process passes to block 174. Block 174 depicts accessing the universally accessible remote server system associated with the matched UCID; and the process ends.

Figure 6:
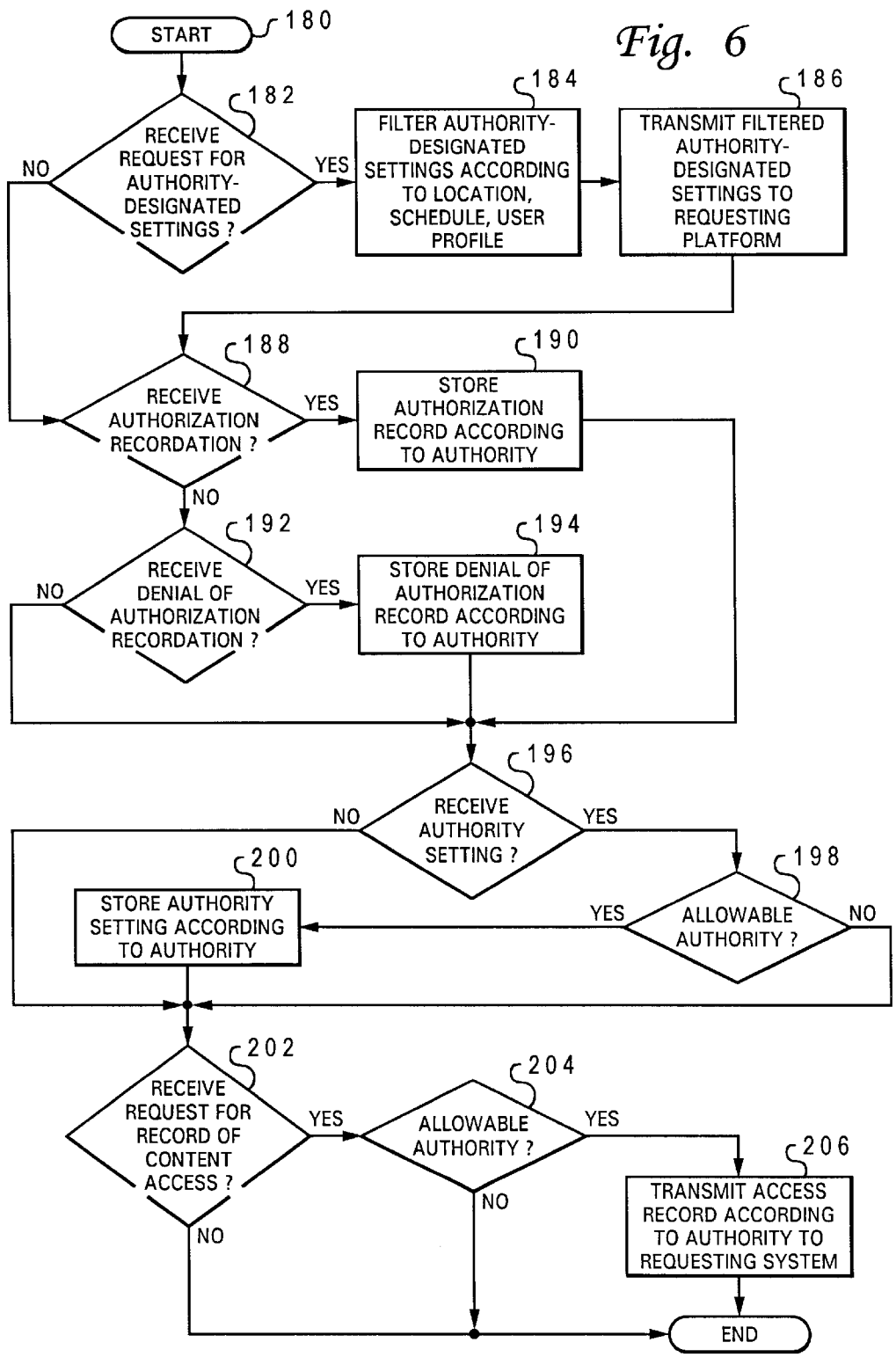
FIG. 6 illustrates a high level logic flowchart of a process and program for controlling access to a universally accessible server system according to a particular universal identifier in accordance with the present invention.

With reference now to FIG. 6, there is depicted a high level logic flowchart of a process and program for controlling access to a universally accessible server system according to a particular universal identifier in accordance with the present invention. As illustrated, the process starts at block 180 and thereafter proceeds to block 182. Block 182 depicts a determination as to whether or not a request for authority-designated settings is received. If a request is not received, then the process passes to block 188. If a request is received, then the process passes to block 184. Block 184 illustrates filtering the authority-designated settings according to location, schedule, and user profile. Next, block 186 depicts transmitting the filtered authority-designated settings to the requesting platform; and the process passes to block 188.

Block 188 depicts a determination as to whether or not an authorization recordation is received. If an authorization recordation is not received, then the process passes to block 192. If an authorization recordation is received, then the process passes to block 190. Block 190 illustrates storing the authorization record to according to the authority from which access is authorized; and the process passes to block 196.

Block 192 depicts a determination as to whether or not a denial of authorization recordation is received. If a denial of authorization recordation is not received, then the process passes to block 196. If a denial of authorization recordation is received, then the process passes to block 194. Block 194 illustrates storing the denial of authorization record according to the authority from which the access is denied; and the process passes to block 196.

Block 196 illustrates a determination as to whether or not an authority setting is received from a particular authority to the user. If an authority setting is not received, then the process passes to block 202. If an authority setting is received, then the process passes to block 198. Block 198 depicts a determination as to whether or not the authority is included in a list of allowable authorities. If the authority is not an allowable authority, then the process passes to block 202. If the authority is an allowable authority, then the process passes to block 200. Block 200 illustrates storing the authority setting according to the particular authority; and the process passes to block 202.

Block 202 depicts a determination as to whether or not a request for a record of content access is received. If a request for a record of content access is not received, then the process ends. If a request for a record of content access is received, then the process passes to block 204. Block 204 illustrates a determination as to whether or not the authority is included in the list of allowable authorities. If the authority is not included as an allowable authority, then the process ends. If the authority is included as an allowable authority, then the process passes to block 206. Block 206 depicts transmitting a content access record according to the requesting authority to a requesting system; and the process ends.

Figure 7B:
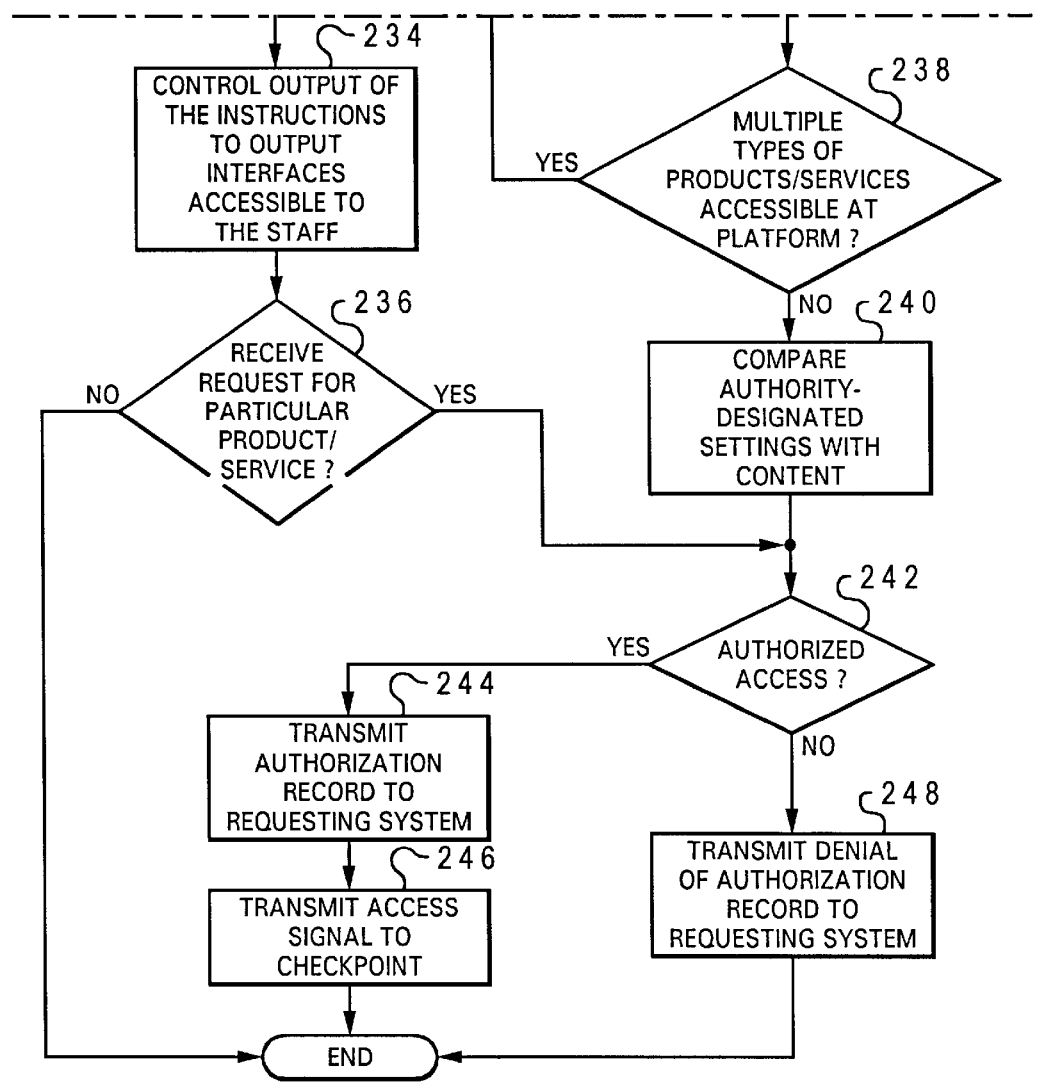
FIG. 7 depicts a high level logic flowchart of a process and program for controlling an authority-enabled platform in accordance with the present invention.

Referring now to FIG. 7, there is illustrated a high level logic flowchart of a process and program for controlling an authority-enabled platform in accordance with the present invention. As depicted, the process starts at block 210 and thereafter proceeds to block 212. Block 212 illustrates a determination as to whether or not a UCID entry is received at a platform. If a UCID entry is not received at a platform, then the process iterates at block 212. If a UCID entry is received at a platform, then the process passes to block 214.

Block 214 depicts transmitting the UCID to the universally accessible database with a request for authority-designated settings. Next, block 216 illustrates a determination as to whether or not authority-designated settings are received from a universally accessible remote server system according to the UCID. If authority-designated settings are not received, then the process passes to block 212. If authority-designated settings are received, then the process passes to block 218.

Block 218 illustrates a determination as to whether or not the authority-designated settings are encrypted. If the authority-designated settings are not encrypted, then the process passes to block 238. If the authority-designated settings are encrypted, then the process passes to block 220. Block 220 depicts filtering the encrypted authority-designated settings with decryption keys. Next, block 222 illustrates a determination as to whether or not the authority-designated settings are decrypted. If the authority-designated settings are not decrypted, then the process passes to block 212. If the authority-designated settings are decrypted, then the process passes to block 238.

Block 238 depicts a determination as to whether or not multiple types of content in products/services is accessible via the platform. If multiple types of content are not accessible, then the process passes to block 240. If multiple types of content are accessible, then the process passes to block 224.

Block 224 depicts comparing the authority-designated settings and any user-designated preferences with the available content in the products and services. For example, the authority-designated settings and any user designated preferences are compared with the content of available television shows. Next, block 226 illustrates transmitting the authorized selection of products/services for the user to the user's portable computer system. Thereafter, block 228 depicts designating a selection of advertisements from the advertising database according to authority-designated settings and user-designated preferences. Next, block 230 illustrates controlling output of the selection of advertisements to multiple output interfaces accessible to the user. Thereafter, block 232 depicts designating instructions to staff for the user according to authority-designated settings and user-designated preferences. Next, block 234 illustrates controlling output of the instructions to output interfaces accessible to the staff; and the process passes to block 236. Block 236 illustrates a determination as to whether or not a request for a particular product/service has been received. If a request has not been received after a particular period of time, then the process ends. If a request is received, then the process passes to block 242.

Block 240 depicts comparing authority-designated settings with the content accessible via the platform. Next, block 242 illustrates a determination as to whether or not access is authorized. Access is authorized to a particular product/service or content if enabled by the authority-designated settings. If access is not authorized, then the process passes to block 248. Block 248 depicts transmitting a denial of authorization record to the universally accessible database according to the UCID; and the process ends. If access is authorized, then the process passes to block 244. Block 244 illustrates transmitting an authorization record to the universally accessible database according to the UCID. Next, block 246 depicts transmitting an access signal to a check point to enable access to the content to the user; and the process ends.

Referring now to FIG. 8, there is illustrated a pictorial illustration of multiple data storage structures for storing authority-designated settings and other data in accordance with the method, system and program of the present invention. As depicted, a data storage structure 260 includes a listing of authority-designated settings according to authority and type of setting for a particular child. For example, parent A has set a television setting of access only to PG or less and access for one hour daily. Advantageously, every television that is accessible to the child is only accessible according to the authority-designated setting.

In another example illustrated, both parent A and library A include settings for books. According to the combination of the settings, the child will only be allowed to check out two or less Dr. Seuss books at any library that is equipped with authority-enabled check-out systems.

In addition, a data storage structure 262 includes a listing of user-designated preferences for the particular child. For example, a child has designated a preferences for cartoons on television. Therefore, a television that receives authority-designated settings and user-designated settings for the child will first select television programs that are rated PG or lower and last an hour or less. Then the television will further filter that selection to highlight cartoons.

Moreover, a data storage structure 264 includes a listing of authorities and passwords in order to access recorded authorization, denial of authorization and location(if applicable). In the example, Sylvia is parent A and has designated a list of authorities for the child including herself, parent B, library A, and babysitter A. Parent A is preferably given access to all data in the child's authorization record according to graphical indicator 226 which is only designatable by parent A, while other authorities are only allowed access to particular records. In addition, any authority-designated settings which contradict those set by parent A are overridden. However, parent B is not given access to all data in the child's authorization record, however may access authorization records that are a result of the authority-designated settings by parent B. For example, a record of radio listening is recorded in data storage structure 224 in association with the authority-designated setting by parent B in data storage structure 220 of radio access to classical or oldies radio stations only.

It is important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for enforcing an authority-designated access policy, said method comprising the steps of:

accessing a plurality of authority-designated settings via a network from a universally accessible database according to a particular universal identifier associated with a particular user at a particular authority-enabled system, wherein said plurality of authority-designated settings designate levels of access to particular types of content as determined by at least one of a plurality of authorities to said particular user;

comparing said authority-designated settings at said particular authority-enabled system with a plurality of types of content provided by said particular authoritys enabled system; and only allowing access for said particular user to a selection of said plurality of types of content that are enabled according to said authority-designated settings received at said particular authority-enabled system, such that said particular authority-enabled system enforces an authority-designated access policy for a particular user at said particular authority-enabled system.

2. The method for enforcing an authority-designated access policy according to claim 1, said method further comprising the steps of:

controlling output of said selection of types of content to an output interface controlled by said particular authority-enabled system.

3. The method for enforcing an authority-designated access policy according to claim 1, said method further comprising the steps of:

receiving a request for access to a particular type of content at said authority-enabled system from said particular user;

determining whether or not said particular type of content is included within said selection of said plurality of types of content; and transmitting a record of authorization from said particular authority-enabled system via said network to said universally accessible database according to said particular universal identifier, in response to determining that said particular type of content is included within said selection of said particular types of content.

4. The method for enforcing an authority-designated access policy according to claim 3, said method further comprising the steps of:

recording said request for access to said selection of said plurality of types of content at a customer history database according to said particular user at said particular authority-enabled system.

5. The method for enforcing an authority-designated access policy according to claim 1, said step of accessing a plurality of authority-designated settings from a universally accessible database according to a particular universal identifier associated with a particular user, further comprising the steps of:

accessing said plurality of authority-designated settings from said universally accessible database at a remote server system accessible via a network according to said particular universal identifier that controls said particular authority-enabled system according to a particular authorization policy.

6. The method for enforcing an authority-designated access policy according to claim 5, said method further comprising the step of:

adjusting authorization requirements for said particular authority-enabled system at said remote server system.

7. The method for enforcing an authority-designated access policy according to claim 5, said method further comprising the step of:

controlling a plurality of authority-enabled systems accessible via said network by said remote server system according to said particular authorization policy.

8. A system for enforcing an authority-designated access policy, said system comprising:

means for accessing a plurality of authority-designated settings via a network from a universally accessible database according to a particular universal identifier associated with a particular user at a particular authority-enabled system, wherein said plurality of authority-designated settings designate levels of access to particular types of content as determined by a plurality of authorities to said particular user;

means for comparing said authority-designated settings at said particular authority-enabled system with a plurality of types of content provided by said particular authority-enabled system; and means for only allowing access for said particular user to a selection of said plurality of types of content that are enabled according to said authority-designated settings received at said particular authority-enabled system, such that said particular authority-enabled system enforces an authority-designated access policy for a particular user at said particular authority-enabled system.

9. The system for enforcing an authority-designated access policy according to claim 8, said system further comprising:

means for controlling output of said selection of types of content to an output interface controlled by said particular authority-enabled system.

10. The system for enforcing an authority-designated access policy according to claim 8, said system further comprising:

means for receiving a request for a access to a particular type of content at said authority-enabled system from said particular user;

means for determining whether or not said particular type of content is included within said selection of said plurality of types of content; and means for transmitting a record of authorization from said particular authority-enabled system via said network to said universally accessible database according to said particular universal identifier, in response to determining that said particular type of content is included within said selection of said particular types of content.

11. The system for enforcing an authority-designated access policy according to claim 10, said system further comprising:

means for recording said request for access to said selection of said plurality of types of content at a customer history database according to said particular user at said particular authority-enabled system.

12. The system for enforcing an authority-designated access policy according to claim 8, said means for accessing a plurality of authority-designated settings from a universally accessible database according to a particular universal identifier associated with a particular user, further comprising:

means for accessing said plurality of authority-designated settings from said universally accessible database at a remote server system accessible via a network according to said particular universal identifier that controls said particular authority-enabled system according to a particular authorization policy.

13. The system for enforcing an authority-designated access policy according to claim 12, said system further comprising:

means for adjusting authorization requirements for said particular authority-enabled system at said remote server system.

14. The system for enforcing an authority-designated access policy according to claim 12, said system further comprising:

means for controlling a plurality of authority-enabled systems accessible via said network by said remote server system according to said particular authorization policy.

15. A program for enforcing an authority-designated access policy, residing on a computer usable medium having computer readable program code means, said program comprising:

means for accessing a plurality of authority-designated settings via a network from a universally accessible database according to a particular universal identifier associated with a particular user at a particular authority-enabled system, wherein said plurality of authority-designated settings designate levels of access to particular types of content as determined by a plurality of authorities to said particular user;

means for comparing said authority-designated settings at said particular authority-enabled system with a plurality of types of content provided by said particular authority-enabled system; and means for only allowing access for said particular user to a selection of said plurality of types of content that are enabled according to said authority-designated settings received at said particular authority-enabled system, such that said particular authority-enabled system enforces an authority-designated access policy for a particular user at said particular authority-enabled system.

16. The program for enforcing an authority-designated access policy according to claim 15, said program further comprising:

means for controlling output of said selection of types of content to an output interface controlled by said particular authority-enabled system.

17. The program for enforcing an authority-designated access policy according to claim 15, said program further comprising:
   means for receiving a request for a access to a particular type of content at said authority-enabled system from said particular user;
   means for determining whether or not said particular type of content is included within said selection of said plurality of types of content; and
   means for transmitting a record of authorization from said particular authority-enabled system via said network to said universally accessible database according to said particular universal identifier, in response to determining that said particular type of content is included within said selection of said particular types of content.

18. The program for enforcing an authority-designated access policy according to claim 17, said program further comprising:
   means for recording said request for access to said selection of said plurality of types of content at a customer history database according to said particular user at said particular authority-enabled system.

19. The program for enforcing an authority-designated access policy according to claim 15, said program further comprising:
   means for accessing said plurality of authority-designated settings from said universally accessible database at a remote server system accessible via a network according to said particular universal identifier that controls said particular authority-enabled system according to a particular authorization policy.

20. The program for enforcing an authority-designated access policy according to claim 19, said program further comprising:
   means for adjusting authorization requirements for said particular authority-enabled system at said remote server system.

21. The program for enforcing an authority-designated access policy according to claim 19, said program further comprising:
   means for controlling a plurality of authority-enabled systems accessible via said network by said remote server system according to said particular authorization policy.

22. A method for managing access to content by a user, said method comprising the steps of:
   receiving entries for a plurality of authority-designated settings from a plurality of allowable authorities to said particular user at a universally accessible database according to a particular universal identifier associated with said particular user, wherein said plurality of authority-designated settings designate levels of access to particular types of content;
   transmitting said plurality of authority-designated settings from said universally accessible database according to said particular universal identifier to a plurality of authority-enabled systems via a network, wherein each of said plurality of authority-enabled systems controls access to at least one type of content;
   receiving and storing at said universally accessible database according to said particular universal identifier an indication of authorization for said particular user to said at least one type of content controlled by one of said plurality of authority-enabled systems, such that authorization for content to said particular user is monitored at said universally accessible database according to said particular universal identifier associated with said particular users.

23. The method for managing access to content by a user according to claim 22, said step of receiving entries for a plurality of authority-designated settings from a plurality of allowable authorities to said particular user at a portable data storage medium associated with said particular user, further comprising the steps of:
   transmitting a request for access to a particular type of content from said universally accessible database according to said particular universal identifier via said network to a remote computer system accessible to one of said plurality of allowable authorities; and
   receiving an entry for a one-time access to said particular type of content from said remote computer system by said one of said plurality of allowable authorities at said universally accessible database according to said particular universal identifier.

24. The method for managing access to content by a user according to claim 22, said step of receiving and storing at said universally accessible database according to said particular universal identifier an indication of authorization for said particular user to said at least one type of content controlled by one of said plurality of authority-enabled systems, further comprising the step of:
   receiving said indication of authorization that indicates said particular user was allowed access to said at least one type of content controlled by said one of said plurality of authority-enabled systems.

25. The method for managing access to content by a user according to claim 22, said step of receiving and storing at said universally accessible database according to said particular universal identifier an indication of authorization for said particular user to said at least one type of content controlled by one of said plurality of authority-enabled systems, further comprising the step of:
   receiving said indication of authorization that indicates said particular user was denied access to said at least one type of content controlled by said one of said plurality of authority-enabled systems.

26. The method for managing access to content by a user according:to claim 22, said method further comprising the steps of:
   receiving a request from a particular authority for access to a plurality of indications of authorization stored at said universally accessible database according to said particular identifier; and
   only allowing said particular authority to access said plurality of indications of authorization that were received in response to authority-designated settings by that said particular authority.

27. A system for managing access to content by a user, said system comprising:
   means for receiving entries for a plurality of authority-designated settings from a plurality of allowable authorities to said particular user at a universally accessible database according to a particular universal identifier associated with said particular user, wherein said plurality of authority-designated settings designate levels of access to particular types of content;
   means for transmitting said plurality of authority-designated settings from said universally accessible database according to said particular universal identifier to a plurality of authority-enabled systems via a network, wherein each of said plurality of authority-enabled systems controls access to at least one type of content;

means for receiving and storing at said universally accessible database according to said particular universal identifier an indication of authorization for said particular user to said at least one type of content controlled by one of said plurality of authority-enabled systems, such that authorization for content to said particular user is monitored at said universally accessible database according to said particular universal identifier associated with said particular user.

28. The system for managing access to content by a user according to claim 27, said means for receiving entries for a plurality of authority-designated settings from a plurality of allowable authorities to said particular user at a portable data storage medium associated with said particular user, further comprising:

means for transmitting a request for access to a particular type of content from said universally accessible database according to said particular universal identifier via said network to a remote computer system accessible to one of said plurality of allowable authorities; and means for receiving an entry for a one-time access to said particular type of content from said remote computer system by said one of said plurality of allowable authorities at said universally accessible database according to said particular universal identifier.

29. The system for managing access to content by a user according to claim 27, said means for receiving and storing at said universally accessible database according to said particular universal identifier an indication of authorization for said particular user to said at least one type of content controlled by one of said plurality of authority-enabled systems, further comprising:

means for receiving said indication of authorization that indicates said particular user was allowed access to said at least one type of content controlled by said one of said plurality of authority-enabled systems.

30. The system for managing access to content by a user according to claim 27, said means for receiving and storing at said universally accessible database according to said particular universal identifier an indication of authorization for said particular user to said at least one type of content controlled by one of said plurality of authority-enabled systems, further comprising:

means for receiving said indication of authorization that indicates said particular user was denied access to said at least one type of content controlled by said one of said plurality of authority-enabled systems.

31. The system for managing access to content by a user according to claim 27, said system further comprising:

means for receiving a request from a particular authority for access to a plurality of indications of authorization stored at said universally accessible database according to said particular identifier; and means for only allowing said particular authority to access said plurality of indications of authorization that were received in response to authority-designated settings by that said particular authority.

32. A system for managing access to content by a user, residing on a computer usable medium having computer readable program code means, said system comprising:

means for receiving entries for a plurality of authority-designated settings from a plurality of allowable authorities to said particular user at a universally accessible database according to a particular universal identifier associated with said particular user, wherein said plurality of authority-designated settings designate levels of access to particular types of content;

means for transmitting said plurality of authority-designated settings from said universally accessible database according to said particular universal identifier to a plurality of authority-enabled systems via a network, wherein each of said plurality of authority-enabled systems controls access to at least one type of content;

means for receiving and storing at said universally accessible database according to said particular universal identifier an indication of authorization for said particular user to said at least one type of content controlled by one of said plurality of authority-enabled systems, such that authorization for content to said particular user is monitored at said universally accessible database according to said particular universal identifier associated with said particular user.

33. The program for managing access to content by a user according to claim 32, said program further comprising:

means for transmitting a request for access to a particular type of content from said universally accessible database according to said particular universal:identifier via said network to a remote computer system accessible to one of said plurality of allowable authorities; and means for receiving an entry for a one-time access to said particular type of content from said remote computer system by said one of said plurality of allowable authorities at said universally accessible database according to said particular universal identifier.

34. The program for managing access to content by a user according to claim 32, said program further comprising:

means for receiving said indication of authorization that indicates said particular user was allowed access to said at least one type of content controlled by said one of said plurality of authority-enabled systems.

35. The program for managing access to content by a user according to claim 32, said program further comprising:

means for receiving said indication of authorization that indicates said particular user was denied access to said at least one type of content controlled by said one of said plurality of authority-enabled systems.

36. The program for managing access to content by a user according to claim 32, said program further comprising:

means for receiving a request from a particular authority for access to a plurality of indications of authorization stored at said universally accessible database according to said particular identifier; and means for only allowing said particular authority to access said plurality of indications of authorization that were received in response to authority-designated settings by that said particular authority.

* * * * *